United States Patent [19]
House

[11] 3,815,365
[45] June 11, 1974

[54] CONTROL FOR REARVIEW MIRROR

[76] Inventor: John I. House, 27201 Wellington Dr., Franklin, Mich. 48025

[22] Filed: Oct. 19, 1972

[21] Appl. No.: 299,029

Related U.S. Application Data

[63] Continuation-in-part of Ser. No. 106,688, Jan. 15, 1971, Pat. No. 3,702,535.

[52] U.S. Cl. .................... 60/572, 60/568, 60/584, 60/587
[51] Int. Cl. ............................................. F15b 7/00
[58] Field of Search ............ 60/54.5 R, 54.6 R, 571, 60/572, 573, 586, 587

[56] References Cited
UNITED STATES PATENTS

| | | | |
|---|---|---|---|
| 2,217,461 | 10/1940 | Weiche | 60/54.6 R |
| 2,397,270 | 3/1946 | Kelly | 60/54.5 R |
| 2,410,978 | 11/1946 | Kelly | 60/54.5 R |
| 3,048,978 | 8/1962 | Hare | 60/54.6 R |
| 3,377,847 | 4/1968 | Aske | 60/54.5 R |
| 3,522,705 | 8/1970 | Wienecke | 60/54.6 R |
| 3,686,863 | 8/1972 | Perrault et al. | 60/54.5 R |
| 3,702,535 | 11/1972 | House | 60/54.5 R |

FOREIGN PATENTS OR APPLICATIONS
151,429 0/1937 Austria............................. 60/54.5 R

*Primary Examiner*—Edgar W. Geoghegan
*Assistant Examiner*—A. M. Zupcic
*Attorney, Agent, or Firm*—Whittemore, Hulbert & Belknap

[57] ABSTRACT

A remote control actuating mechanism for adjusting the angular position of an outside vehicle rearview mirror. The mechanism comprises a master control device and a slave device, each having a piston reciprocable within a cylinder. Hydraulic circuits connect the two devices so that when the control piston is manually moved in one direction or the other there is a corresponding movement of the slave piston. A rack and gear connection between the slave piston and the mirror causes the mirror to be angularly adjusted in response to movement of the slave piston. A reservoir associated with the master cylinder communicates with both hydraulic circuits and has a control plunger for adjusting the pressure of fluid therein.

1 Claim, 2 Drawing Figures

PATENTED JUN 11 1974                                           3,815,365
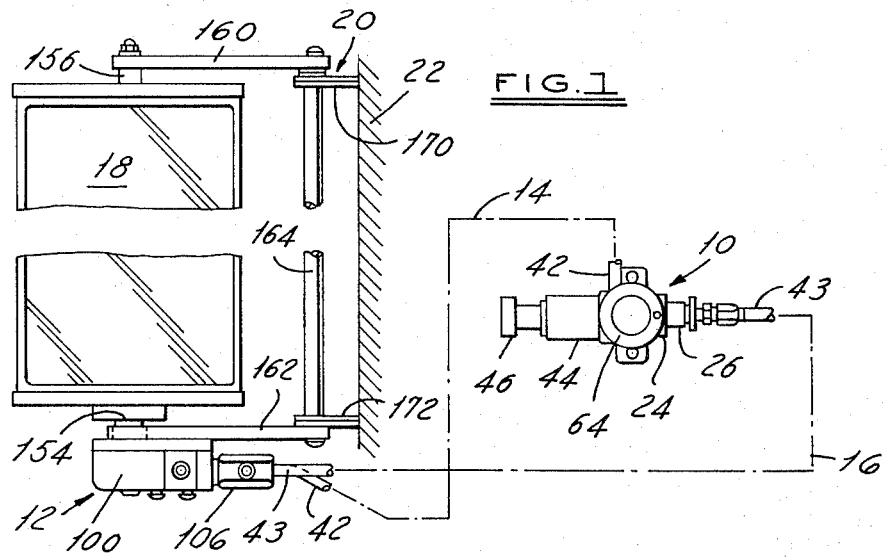
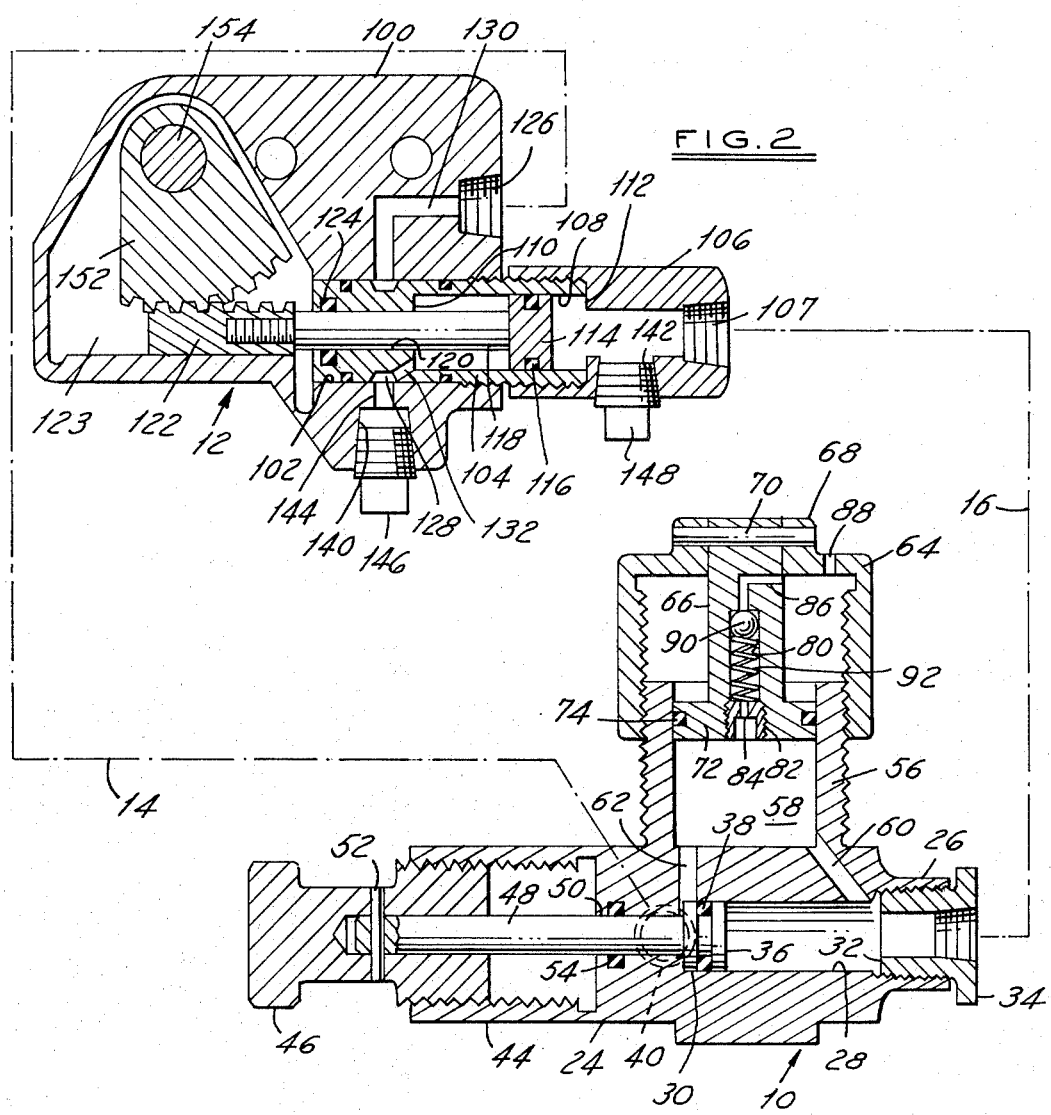

CONTROL FOR REARVIEW MIRROR

REFERENCE TO COPENDING APPLICATION

This application is a continuation-in-part of my copending application Ser. No. 106,688, filed Jan. 15, 1971, now U.S. Pat. No. 3,702,535.

BACKGROUND AND SUMMARY OF THE INVENTION

Conventional remote control actuating mechanisms of the type herein described utilize separate fittings in each hydraulic circuit for filling with hydraulic fluid. In accordance with the present invention, a common reservoir is provided for both hydraulic circuits, preferably associated with the master control cylinder. Further, in accordance with my invention, an adjustable control plunger is provided for the reservoir to adjust and maintain the pressure in both circuits at a predetermined level. Accordingly, it is a simple matter to fill both circuits with hydraulic fluid at one time and to maintain a predetermined pressure in both circuits. Expansion or contraction of the hydraulic fluid in the circuits due to a change in temperature or to loss of hydraulic fluid as a result of a minor leak can readily be compensated for by adjustment of the control plunger.

One specific embodiment of my invention will now be described in conjunction with the accompanying drawing wherein:

FIG. 1 is an elevational view showing an outside rearview mirror mounted on the side or on the door of a vehicle, and also showing the remote control actuating mechanism including the master control device and the slave device.

FIG. 2 is a view of the master control device and the slave device shown in section and showing the hydraulic circuits connecting the two devices.

Referring now more particularly to the drawing, the remote control actuating mechanism includes a control device 10, a slave device 12, hydraulic circuits 14 and 16 connecting the two devices, a vertical rearview mirror 18 angularly adjustably mounted on the slave device, and a bracket assembly 20 for mounting the slave device and mirror outside the vehicle on a door or side 22 thereof. The remote control mechanism for the mirror is particularly designed for use in connection with trucks and buses.

The master control device 10 comprises an elongated tubular casing 24 having a reduced internally threaded extension 26 at one end. A cylinder 28 of uniform circular cross section is formed in the casing. The inner end of the cylinder 28 is determined by the transverse casing wall 30 and the outer end 32 is defined by the end of the tubular plug or fitting 34 which is threaded into the reduced extension 26. A piston 36 is rotatable and reciprocable within the cylinder 28, and has an annular groove in which is seated an O-ring 38 adapted to seal against the wall of cylinder 28 and thereby seal one side of the piston from the other.

The casing 24 is also formed with a transverse passage 40 which communicates with the cylinder 28 at the left side of the piston in FIG. 2 and also communicates with the conduit 42 of the circuit 14 for hydraulic fluid to the slave device. Conduit 43 is adapted to thread into plug 34 and completes the circuit 16 for hydraulic fluid to the slave device.

The casing 24 has at the end opposite the reduced extension 26 an internally threaded extension 44 into which the control knob 46 is threaded. A piston rod 48 extends from the piston 36 through a passage 50 in the casing 24 and is secured to the control knob 46 as by a roll pin 52. The passage 50 in the casing is sealed by an O-ring 54 seated in an annular groove formed in the casing around the passage.

The casing 24 is formed with an upward externally threaded tubular extension or cylinder 56 which defines a cylindrical reservoir 58 in communication with one end of cylinder 28 through passage 60 and with the other end of cylinder 28 through passage 62. A filler cap 64 of inverted cup-shape is internally threaded and is threaded on the tubular extension 56. A plunger 66 which is secured to a thickened portion 68 of the base of the cap 64 as by a roll pin 70 has a head 72 on its lower end which is capable of axial sliding movement and rotation in the reservoir 58. The head of the plunger is formed with an annular groove in which is seated an O-ring 74 to seal around the head and thereby maintain the reservoir 58 sealed from the outside.

The plunger has an axially extending chamber 80 closed at the lower end by a set screw 82 which is threaded into the plunger and has a narrow passage 84 to provide communication between the reservoir 58 and the chamber 80. The chamber 80 communicates at its upper end with the interior of the cap 64 by way of a narrow passage 86. A vent 88 to the atmosphere is provided in the base of the cap. Normally the passageway through the plunger is closed by a check valve 90 seated against the upper end of the chamber 80 by a compression coil spring 92. However, a sufficient drop in the pressure in the reservoir 58, as when the plunger is withdrawn by unthreading cap 68, will permit air to enter the reservoir past the check valve 90 and against the action of the spring 92.

The slave device 12 comprises a housing 100 having an elongated opening 102 in which an elongated cylinder forming member 104 is threaded. A tubular fitting 106 is threaded on the projecting end of the member 104. The conduit 43 of circuit 16 is adapted to thread into the fitting 106 where indicated at 107.

Member 104 is formed with a cylinder 108 of uniform circular cross section. The inner end of the cylinder is determined by the transverse wall 110 in member 104. The outer end of the cylinder 108 opens through the projecting end of member 104 into the fitting 106 and its outer end is determined by the transverse annular wall 112 of the fitting. A piston 114 is reciprocable within cylinder 108 and has an annular groove in which an O-ring 116 is seated to seal against the wall of the cylinder and thereby seal one side of the piston from the other. The cylinder 108 and piston 114 of the slave device 12 are the same diameter as the cylinder 28 and piston 36 of the master control device 10.

A piston rod 118 extends from the piston 114 through a passage 120 in member 104 and is secured as by threading to the rack 122 in housing chamber 123. The passage 120 is sealed by an O-ring 124 seated in an annular groove formed in member 104 around the passage.

The conduit 42 is adapted to thread into housing 100 where indicated at 126 and communicates with an external annular groove 128 in member 104 by way of passage 130. The groove 128 is in communication with the inner end of cylinder 108 through one or more ports 132.

Bleeder ports 140 and 142 are provided for the hydraulic circuits 14 and 16. The port 140 is formed in housing 100 and communicates with the annular groove 128 through passage 144, and bleeder port 142 is formed in the fitting 106 and communicates with the interior of the fitting. These ports are closed by bleeder plugs 146 and 148 threaded thereinto.

The rack 122 is disposed in housing chamber 123 and is in mesh with a gear segment 152 also within chamber 123. Gear segment 152 is secured to a stub shaft 154 which is journaled for rotation in the housing 100. The shaft 154 is secured to the lower edge of mirror 18. The upper edge of the mirror is secured to a stub shaft 156 which is axially aligned with shaft 154 and rotatably supported by an arm or plate 160.

The mounting 20 for the mirror assembly includes a plate 162 bolted or otherwise secured to the slave device 12, and also includes the arm 160. Arm 160 and plate 162 are pivotally connected to a vertical rod 164 which extends alongside the mirror. The pivotal connections of the arm 160 and plate 162 to the rod 164 have sufficient friction to retain any particular angular adjustment to which they may be set. Thus not only is the mirror adjustable angularly about the aligned axes of stub shafts 154 and 156 by the adjusting mechanism, but it is also adjustable angularly about the common axis of the rod 164. Mounting arms 170 and 172 serve to mount the rod 154 to the side or door of the vehicle.

The hydraulic circuit 14 connecting the two devices 10 and 12 extends from master control cylinder 28 at the left of the piston in FIG. 2 through the passage 40 in casing 24, conduit 42, the passage 130 in the housing 100 of slave device 12, the annular groove 128 in member 104, and ports 132 to the slave cylinder 108 at the left side of the slave piston in FIG. 2. The other hydraulic circuit 16 extends from the master control cylinder 28 at the right side of the piston in FIG. 2 through the fitting 34, conduit 43, and fitting 106 into the slave cylinder 108 at the right side of the slave piston in FIG. 2. The master control and slave pistons 36 and 114 seal the circuits 14 and 16 from one another, although both such circuits are in direct communication with the reservoir 58 through passages 60 and 62 which communicate with opposite ends of the master control cylinder 28.

It will be understood that the two hydraulic circuits will normally be completely filled with hydraulic fluid. Any air in the circuits should be bled away at the bleeder ports 140 and 142 by removal of the plugs 146 and 148 so that the slave device 12 may be operated by the control device 10 without any sponginess.

The reservoir 58 is used as a means to fill both hydraulic circuits, rendering it unnecessary to provide separate fittings for the two circuits to introduce hydraulic fluid. The reservoir 58 is also provided to keep both circuits full of hydraulic fluid at all times, and to replenish either circuit should it suffer a loss of hydraulic fluid volume through a minor leak or as the result of a change in temperature.

In order to fill the hydraulic circuits 14 and 16, the filler cap 64 is removed, at the same time withdrawing the plunger 66 from the reservoir. Check valve 90 will allow air to enter the reservoir during withdrawal of the plunger. Hydraulic fluid such as oil is poured into the reservoir. During the filling operation, the bleeder port plugs 146 and 148 are removed so that air may bleed from both circuits as they are filled from the reservoir. The hydraulic fluid poured into the reservoir enters both circuits 14 and 16 through passages 60 and 62. When oil flows from the bleeder ports 140 and 142, the bleeder port plugs 146 and 148 are reinstalled to close both circuits. The plunger 66 is replaced in the reservoir, as shown in FIG. 2, by threading the filler cap back on extension 56. Prior to reinstalling the plunger 66 and cap 64, the reservoir should be filled to the top so that no air is trapped below the plunger head 72. At this point rearely will all of the air be expelled from the system. To get substantially all of the air out, one or both bleeder ports 140, 142 will be cracked and the plunger forced down to the bottom of the reservoir squeezing out some if not all of the remaining air. A certain amount of oil will also escape. The bleeder ports may be re-closed, the plunger withdrawn and the reservoir refilled, whereupon this pumping procedure may be repeated one or more additional times to get all of the air out of the system. When all of the air is removed from the system, the plunger remains in locked position to maintain a closed circuit. The check valve 90 allows air to enter the reservoir below the plunger when the plunger is withdrawn thus preventing the oil in the circuits from being drawn back out of the circuits and into the reservoir as the plunger rises. After all or substantially all of the air has been pumped out, the cap is screwed down until the desired pressure of hydraulic fluid is established in both circuits so that the mechanism may operate the mirror smoothly without any sponginess. To facilitate the screwing on of the cap, it may be necessary or desirable to open one of the bleeder ports to allow for the escape of hydraulic fluid until the cap has been screwed down to the extent desired.

In use, the manual control device 10 will normally be mounted inside the cab of the truck or bus for convenient operation by the driver. He may angularly adjust the mirror on the outside of the vehicle by simply screwing the knob 46 in or out to move the piston 36 in the master control cylinder one way or the other. This will produce a build up of pressure in one of the hydraulic circuits and cause a similar movement of the piston 114 of the slave device 12, producing angular movement of the mirror through the rack and gear connection 122,152. At the same time that hydraulic fluid is pushed from the control device 10 to the slave device 12 through one of the circuits, hydraulic fluid is returned to the control device through the other circuit.

Any loss in the volume of hydraulic fluid in one circuit or the other, due for example to a small leak or contraction of the hydraulic fluid as a result of a drop in ambient temperature, is automatically compensated for by the fluid in the reservoir 58 which is at all times in communication with both circuits. Likewise, the amount of pressure on the hydraulic fluid may be varied as desired by the driver by merely threading the filler cap 64 one way or the other to raise or lower plunger 66.

What I claim as my invention is:

1. Remote control actuating mechanism for adjusting the angular position of an outside vehicle rearview mirror, comprising a master control device and a slave device, said control device having a hydraulic control cylinder and a manually operable control piston reciprocable therein, said slave device having a hydraulic slave cylinder and a slave piston reciprocable therein, a first hydraulic circuit including a conduit filled with hydraulic fluid communicating at its ends with said cylinders at one side of the pistons therein, a second hydraulic circuit including a conduit filled with hydraulic fluid communicating at its ends with said cylinders at the opposite side of the pistons therein, said control piston having an external knob for manually moving said control piston in one direction or the other and thereby effecting a corresponding movement of said slave piston by hydraulic fluid pressure in one of said circuits, a cylinder providing a reservoir for hydraulic fluid, passages placing said reservoir in communication with both of said first and second hydraulic circuits, a plunger reciprocable in said reservoir to control the pressure of the hydraulic fluid therein and in said first and second hydraulic circuits, means for fixing said plunger in axially adjusted position within said reservoir, passage means leading to said reservoir through a port in the face of said plunger to admit air to said reservoir when said plunger is withdrawn for the purpose of replenishing said reservoir, thereby facilitating withdrawal of said plunger, and a check valve in said passage means preventing flow of fluid out of said reservoir.

* * * * *